US011532138B2

(12) United States Patent
Skidmore (10) Patent No.: US 11,532,138 B2
(45) Date of Patent: Dec. 20, 2022

(54) AUGMENTED REALITY (AR) IMPRINTING METHODS AND SYSTEMS

(71) Applicant: EDX Technologies, Inc., Austin, TX (US)

(72) Inventor: Roger Ray Skidmore, Austin, TX (US)

(73) Assignee: EDX Technologies, Inc., Austin, TX (US)

( * ) Notice: Subject to any disclaimer, the term of this patent is extended or adjusted under 35 U.S.C. 154(b) by 0 days.

(21) Appl. No.: 17/294,188

(22) PCT Filed: Nov. 15, 2019

(86) PCT No.: PCT/US2019/061751
§ 371 (c)(1),
(2) Date: May 14, 2021

(87) PCT Pub. No.: WO2020/102687
PCT Pub. Date: May 22, 2020

(65) Prior Publication Data
US 2022/0005281 A1     Jan. 6, 2022

Related U.S. Application Data

(60) Provisional application No. 62/767,676, filed on Nov. 15, 2018.

(51) Int. Cl.
| G06T 19/00 | (2011.01) |
| H04N 5/232 | (2006.01) |
| G06T 17/00 | (2006.01) |
| H04N 5/76  | (2006.01) |
| H04W 4/029 | (2018.01) |

(52) U.S. Cl.
CPC .......... *G06T 19/006* (2013.01); *G06T 17/00* (2013.01); *H04N 5/232933* (2018.08); *H04N 5/76* (2013.01); *G06T 2200/24* (2013.01); *G06T 2219/024* (2013.01); *H04W 4/029* (2018.02)

(58) Field of Classification Search
CPC . G06T 19/006; G06T 17/00; G06T 2219/024; G06T 2200/24; G06T 19/00; G06T 7/70; G06T 2207/30244; H04N 5/76; H04N 5/232933; H04N 5/232; H04W 4/029; H04W 4/02; G06F 3/14; G06F 3/0346; G06V 20/20; G06V 20/64
See application file for complete search history.

(56) References Cited

U.S. PATENT DOCUMENTS

| 2005/0198686 A1 | 9/2005 | Krause et al. |
| 2007/0265975 A1 | 11/2007 | Farrugia et al. |
| 2010/0194782 A1 | 8/2010 | Gyorfi et al. |
| 2010/0257252 A1 | 10/2010 | Dougherty et al. |
| 2011/0279445 A1 | 11/2011 | Murphy et al. |

(Continued)

FOREIGN PATENT DOCUMENTS

WO    2015/192117 A1    12/2015

*Primary Examiner* — Xilin Guo
(74) *Attorney, Agent, or Firm* — WCF IP (57) ABSTRACT

Augmented reality (AR) content may be created and stored as an imprint on a virtual model, where the virtual model is modeled after or mimics a real world environment. Intuitive mobile device interfaces may be used to link content with objects or surfaces near a mobile device. Subsequent users may access the same content depending on one or more access parameters.

22 Claims, 6 Drawing Sheets

(56) References Cited

U.S. PATENT DOCUMENTS

| | | |
|---|---|---|
| 2012/0249416 A1 | 10/2012 | Maciocci et al. |
| 2013/0088577 A1 | 4/2013 | Hakkarainen et al. |
| 2016/0055884 A1* | 2/2016 | Zaletel .................. G11B 27/34 386/224 |
| 2018/0001198 A1 | 1/2018 | Frappiea |
| 2019/0362555 A1* | 11/2019 | Chen ..................... G06T 19/006 |

* cited by examiner

AUGMENTED REALITY (AR) IMPRINTING METHODS AND SYSTEMS

FIELD OF THE INVENTION

Embodiments of the invention generally relate to augmented reality (AR), and, in particular, methods and systems for producing, storing, and retrieving AR content.

BACKGROUND

U.S. Pat. No. 8,350,871 to Gyorfi et al. describes a method for creating virtual graffiti. An image used as virtual graffiti is associated with a real location. A user near the location is provided with the ability to view the virtual graffiti.

A problem with methods like that of Gyorfi et al. is a poor framework for retaining, modifying, and accessing content. For example, user interfaces dynamically creating and sharing augmented reality content with others are lacking for augmented reality (AR) content systems.

SUMMARY

According to an aspect of some exemplary embodiments, a method of creating and serving augmented reality (AR) content using a virtual model comprises loading visual content on a mobile device comprising a camera; recording the camera's location and orientation upon activation of an interface of the mobile device; selecting a virtual object within a virtual model based on the recorded location and orientation; and presenting the visual content on a surface of the selected virtual object. The method may further comprise recording one or more of a time, user identification, restrictions on eligible future viewers, lifetime, and any designated content triggers upon activation of the interface. The presenting step may comprise verifying a user subscription and granting access to the visual content on a user-by-user basis based on subscription status. The method may further comprise displaying a real time camera feed concurrent with the recording step. The method may further comprise monitoring the interface to detect activation of an interface button. The interface button may be configured to trigger recording of photographs or video with the camera. At least the loading and recording steps may be performed by a first mobile device and at least the presenting step is performed by a second mobile device different from the first mobile device. The first and second mobile devices may be smartphones, head mounted displays, or wearables. The selecting step may be performed by the first mobile device, the second mobile device, or a cloud computing device. The selecting step may use a virtual model modeled to replicate locations and at least some real world objects that are within sight of the mobile device at a time of the recording step. The method may comprise serving the virtual model to a plurality of mobile devices and repeating the presenting step for multiple of the plurality of mobile devices. The method may comprise a step of storing the visual content with the selected virtual object within the virtual model. The method may comprise storing multiple visual contents with a single virtual object, the multiple visual contents being sourced from different mobile users.

According to an aspect of some exemplary embodiments, a non-transitory computer readable medium may comprise computer readable instructions which, when executed by one or more processors, cause the one or more processors to perform loading visual content on a mobile device comprising a camera; recording the camera's location and orientation upon activation of an interface of the mobile device; selecting a virtual object within a virtual model based on the recorded location and orientation; and presenting the visual content on a surface of the selected virtual object.

According to an aspect of some exemplary embodiments, an augmented reality (AR) system may comprise one or more processors configured to perform loading visual content on a mobile device comprising a camera; recording the camera's location and orientation upon activation of an interface of the mobile device; selecting a virtual object within a virtual model based on the recorded location and orientation; and presenting the visual content on a surface of the selected virtual object.

DETAILED DESCRIPTION

Figure 1:
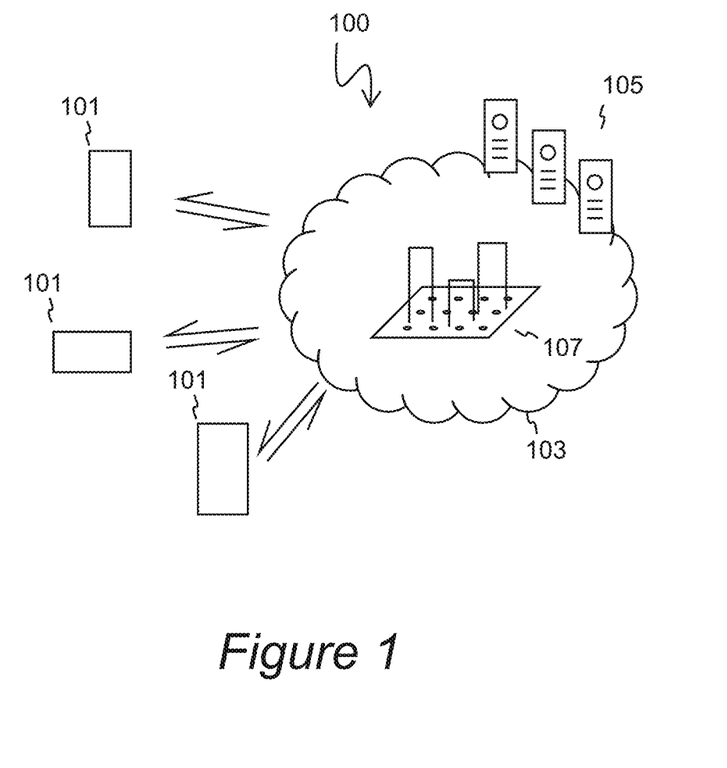
FIG. 1 is a diagram of an exemplary AR system including or supported by a network.

FIG. 1 is a diagram of an exemplary system 100 for augmented reality (AR). Some methods disclosed herein are performable by or with a single mobile device 101. However many of the methods are particularly suited for use by or with a plurality of mobile devices 101. The involvement of a plurality of mobile devices facilitates sharing of AR content among a community of users. One or more networks 103 may be employed for collecting information from the mobile devices (which are often but not necessarily end user devices), sending information to the mobile devices, storing information, and/or processing information. One or more cloud-based computers (e.g., servers) 105 may be elements of the system 100 to perform certain cloud-based functions. A networked system 100 may be centralized, or the networked system 100 may be non-centralized (e.g., a peer-to-peer system). One or more virtual models are stored within the system 100 and used as a backbone for storing, retaining, and retrieving AR content that may be served in AR outputs of mobile devices 101. Data for the virtual model may be stored centrally (e.g., in cloud servers 105) and/or locally on mobile devices 101. The virtual model may be two or three dimensional, and may correspond to and closely match an area of the real world, where objects in the virtual model correspond to objects of similar size, shape, consistency, structure, appearance, etc. in the real world. For example, a 3D virtual model of a city may be comprised of virtual building objects whose absolute or relative size and shape correspond to the real buildings within the city.

Figure 2:
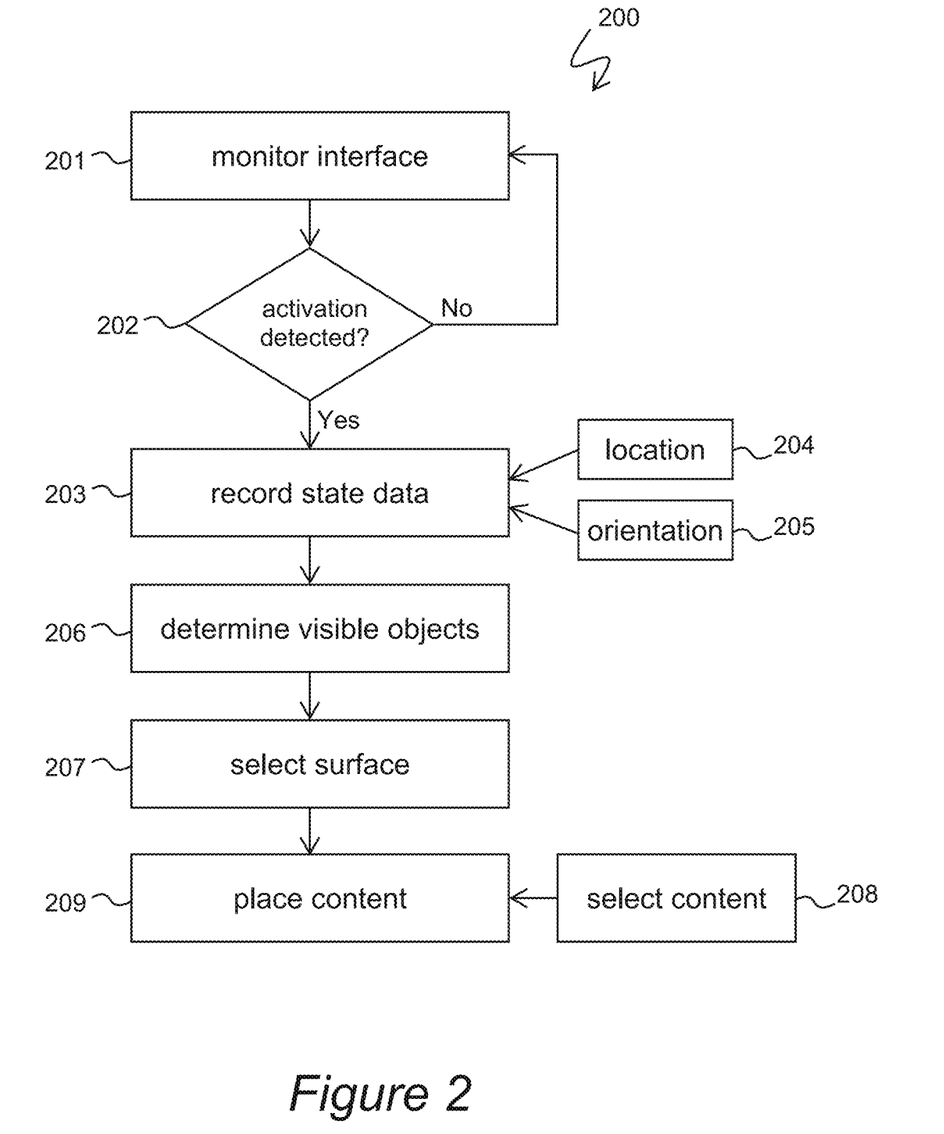
FIG. 2 is a flow diagram of an exemplary method for creating and storing content usable for producing augmented reality (AR).

FIG. 2 is an exemplary method 200 for creating and storing AR content. The method 200 may be employed to produce user-supplied AR content that is in semantic context with a real world environment. Parts of a method may be referred to interchangeably as "steps" or "blocks".

Step 201 comprises monitoring an interface of the mobile device for user activation. This step serves a purpose of recognizing when a user wishes to produce AR content and differentiate such events from moments when the user does not wish to produce AR content. The method 200 may be user intuitive by monitoring an activation technique well known among end users, such as the activation of a camera. Cameras are widespread among mobile devices like smartphones, and users of such devices are generally familiar with the means by which the camera can be activated to capture a photograph or a video. This may be, for example, a volume button, home button, or touchscreen button. It may also or alternatively be a voice command or gesture. Step 201 may monitor the mobile device's camera and/or supporting software to recognize when a user activates the camera according the device's native method of capturing a photo or video.

Step 202 is a decision block to decide whether user activation is detected or not. If no activation is detected, monitoring may continue and no AR content is created, at least not yet. If activation is detected, method 200 proceeds with the next step.

Step 203 comprises recording sensor data describing a state of the mobile device at the time of the activation. The state of the mobile device may comprise the device's pose. Pose consists of a location 204 and orientation 205. The state of the mobile device may comprise types of information collected from, for example, the device's gyroscope, digital compass, GPS module, thermometer, magnetometer, and altimeter. Note that when the 3D virtual model 107 corresponds to the real world, the pose of the device in the real world may be mapped directly into a pose within the virtual model. The state data may describe the mobile device or, more specifically, components thereof like the camera. In some embodiments it may be assumed that the mobile device's state accurately reflects the user's state. For instance, a person who carries a smartphone with her generally shares the same location as the smartphone. As another example, if a person is directing the smartphone's camera to face a particular direction, the person likely has her attention on the device and as a result is facing the same particular direction as the camera. Provided this traditional use behavior of some mobile devices, discussion of a "device's" state or state component may generally be treated as a discussion of a "user's" state or state component.

A variety of other data may be recorded upon activation of the interface or subsequent to activation of the interface. The data may then be associated or linked with the recorded state or specific content. For example, the mobile device may record one or more of a time, user identification, restrictions on eligible future viewers, lifetime, and any designated content triggers. A "user identification" may be used to characterize and differentiate specific users (be the user a device or a person) or different classes of users (e.g., "top secret" vs "classified"). A "lifetime" may be a timer or similar mechanism which tracks time which elapses between the time the "lifetime" starts (e.g., the time of the activation of the interface) and a predetermined end time. At the end time, the "lifetime" feature may be configured to automatically delete, disable, or remove any content associated with the lifetime from the device on which it is stored. A "lifetime" may also be described as an "expiration" or "duration."

Step 206 takes the mobile device state data and uses it to determine or identify objects which are "visible" to the mobile device or to the user. Visible objects may be identified using, for example, a line of sight (LoS) test. A line of sight may be assessed emanating from the recorded location 204 in the direction implicated by the recorded orientation 205. Virtual objects the locations of which lie along the line of sight may be identified as visible in step 206. Alternatively, object visibility may be determined using an applied frustum. Frustums are similar to lines of sight in that they assess what exists ahead or in front of a device or camera. Frustums are advantageous over a mere line of sight, however, in that they take into account three dimensional space and the manner in which both cameras and human eyes perceive surroundings (e.g., a greater amount of distant physical space is visible as compared to the amount of near physical space that is visible). A frustum can be determined using the pose information from step 203. Using the location, orientation, and assumptions about near and far limits, the camera's frustum from the time of activation is determined. The frustum is then applied as a viewing frustum within the virtual model 107 (FIG. 1). Virtual objects which fall within the boundaries of the applied viewing frustum are found to be "visible" for purposes of step 206.

Step 207 selects one or more surfaces of one or more visible objects. These surfaces may have corresponding counterpart virtual surfaces within the virtual model. In many instances, the step involves selecting a single surface of a single object. The selected surface designates where AR content is stored with respect to the two- or three-dimensional configuration and arrangement of other virtual content and of real world surroundings with which the virtual content is in semantic context. As a loose analogy, a graffiti artist in the real world must not only select a structure on which to paint but one or more surfaces of that structure on to which to apply his paint. So too in the placement of virtual content a selection is necessary of a virtual object and one or more surfaces of that object on to or with respect to which the virtual content will be placed. Step 207 may include substeps which refine the specificity (e.g., the exact boundaries) of the selected surface.

Step 208 selects content that will be stored on or with the selected object and surface. A variety of different subprocesses may be employed for content selection. As one example, a user may select content himself or herself. For example a user may select a photograph or graphic from his or her own device storage. A user may also draw content by tracing over the device screen with their finger or stylus. For example, a user could draw an 'X' or a circle. The mobile device may be configured to prompt the user for a selection and receive the user's response. The mobile device may permit the user to create content (e.g., using a drawing utility on the device) that is selected. Other selection processes may also be used.

Step 209 places the selected content in relation to the selected surface. At this step the selected content becomes part of the virtual model 107 (FIG. 1). The new augmented content is incorporated into or associated with, and stored with or alongside of, the virtual model. The format may take the form of an image, texture, pattern, map, color overlay or other similar technique that is applied to the surface or surfaces within the virtual model that the new content is associated with. This may also take the form of a new entity, such as a new surface or object, which is generated within the virtual model. Note that these surfaces or new entities need not be flat or two-dimensional, but may be as widely varying as surfaces in the real world, including curved, irregular, and complex objects and shapes.

It should be appreciated that the placement of the content takes into account more than a location. The object, and in particular the surface of the object, with which the content has been associated has a relationship with other objects and surroundings according to a multidimensional (e.g., three-dimensional) spatial framework. Location information alone (e.g., a set of GPS coordinates) fails to supply true semantic context between virtual content and real content. Rather, location is but one relevant aspect. Using a virtual model which contains a plurality of virtual objects modeled to simulate real world objects provides a far superior spatial system for placing content. Moreover, the visible object determination at step 206 is an intuitive technique by which a user may place AR content anywhere in his or her surroundings and not just at his or her specific location (e.g., where the person is presently standing).

Figure 3:
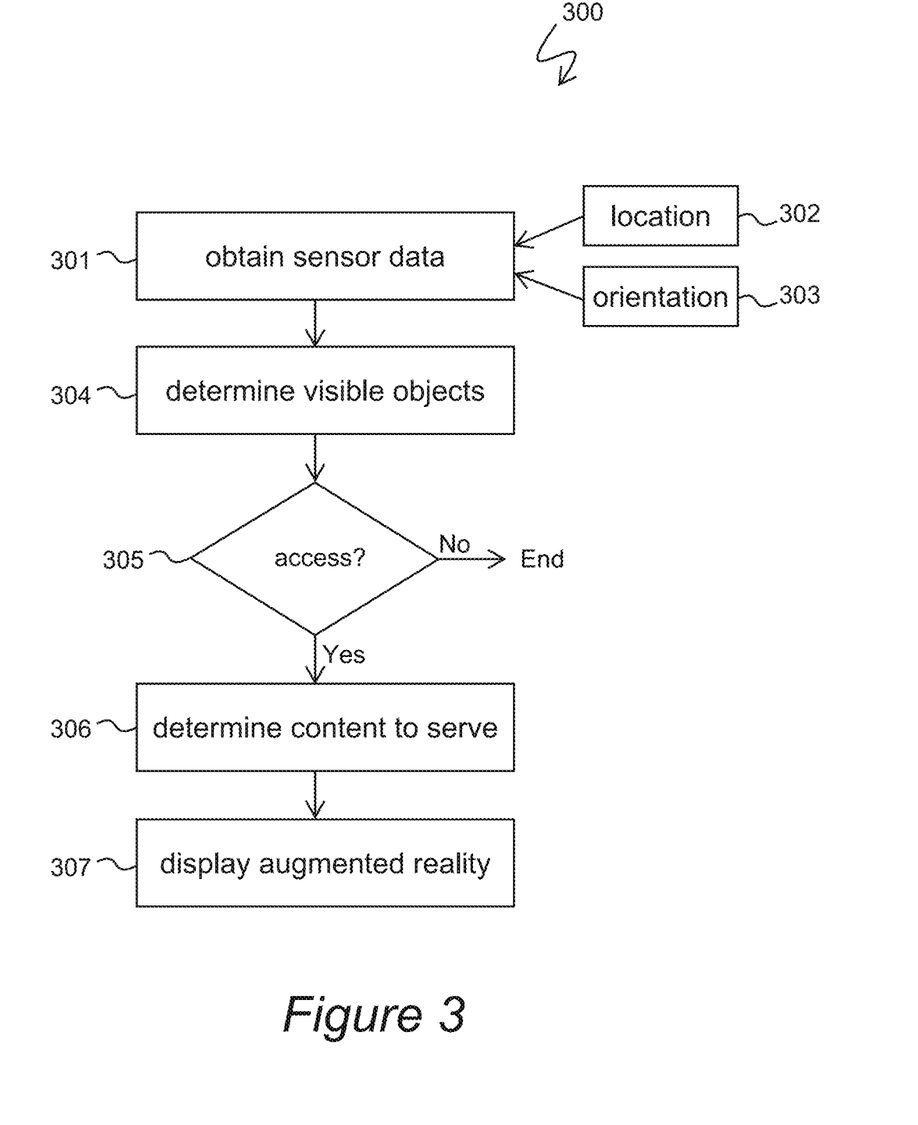
FIG. 3 is a flow diagram of an exemplary method for retrieving and serving AR content to an end user.

FIG. 3 illustrates an exemplary method 300 for retrieving and serving AR content. In some embodiments, it is desirable that only AR content which is in semantic context to the specific AR consumer's real world surroundings be retrieved and supplied to that consumer. The retrieved content may be content created according to method 200 or some other content which virtual model 107 (FIG. 1) has stored in semantic context with a real world environment.

Step 301 obtains mobile device sensor data. Generally this will include at least location 302 and orientation 303. Additional sensor data may also be collected, e.g., time.

Step 304 determines whether any virtual objects in the surroundings are "visible" based on the sensed location and orientation (and/or other sensor data) of the mobile device from block 301. The approach to determining object visibility may be substantially the same if not identical to the object visibility determination process of block 206 of method 200 (FIG. 2). Exemplary processes may, for example, determine and apply a line of sight (LoS) or a viewing frustum.

Step 305 checks whether the user who is retrieving content with method 200 has access to the visible virtual objects or content stored in connection with such objects. Any of a variety of security or authorization protocols may be employed to grant or deny access to the virtual content. As an exemplary subprocess, step 305 may comprise or consist of verifying a user subscription and granting access to content on a user-by-user basis based on a subscription status. In some embodiments step 305 may be omitted.

Content may be have data associated therewith (e.g., a digital "tag") which regulates, controls, or limits access to the content. Some of this data maybe referred to as designated content triggers. The inquiry at step 305 is one non-limiting example. As discussed above in connection with method 200, a variety of data may be associated with a recorded state and/or with particular content. Access may only be granted to certain content if it meets one or more requirements such as: user identification, user class, lifetime or expiration date, and proximity at time of access request. A "user identification" itself may define who is allowed to view the created content, but the user may have the ability to "tag" created content with a separate authorization criteria (e.g., "top secret" vs "classified") allowable to the user. Respecting proximity at time of access request, certain content may only be viewable when the viewer has predetermined proximity with respect to certain objects or locations. For example, future viewers may need to be within some distance (e.g., 10 feet) of the surface with which certain content is stored to access that content, or within some distance (e.g., 10 feet) of the location where the user was standing at imprint time (location 204).

Step 306 determines or identifies what virtual content from the visible virtual objects should be served (and correspondingly what should not be served). This step may involve a number of determinations. As discussed above, AR content creation may involve associating visual content with particular sides or surfaces of particular virtual objects. Thus one consideration of step 306 may be to identify the side or sides (surface or surfaces) of the virtual object from which AR content should be taken. Another consideration of step 306 may be to identify what AR content to take from a single side, as in cases when a plurality of separate contents have been stored for the same surface of the same object. Displaying all of the content at once could lead to overlapping visual content and/or other conflicts. Another consideration of step 306 may be to check the metadata of stored content and determine whether or not to display the content based on the metadata. For example, content may be timestamped and only content from a particular time, time period, or within a particular expiration period may be retrieved. There may be multiple levels of criteria involved in determining when, how, or to whom content may be displayed. For example, content could be displayed only to a particular user within a particular time frame and within a certain viewing distance from the location of the content.

Step 307 finally displays the retrieved content to the user in the form of an augmentation of an AR output.

Figure 4:
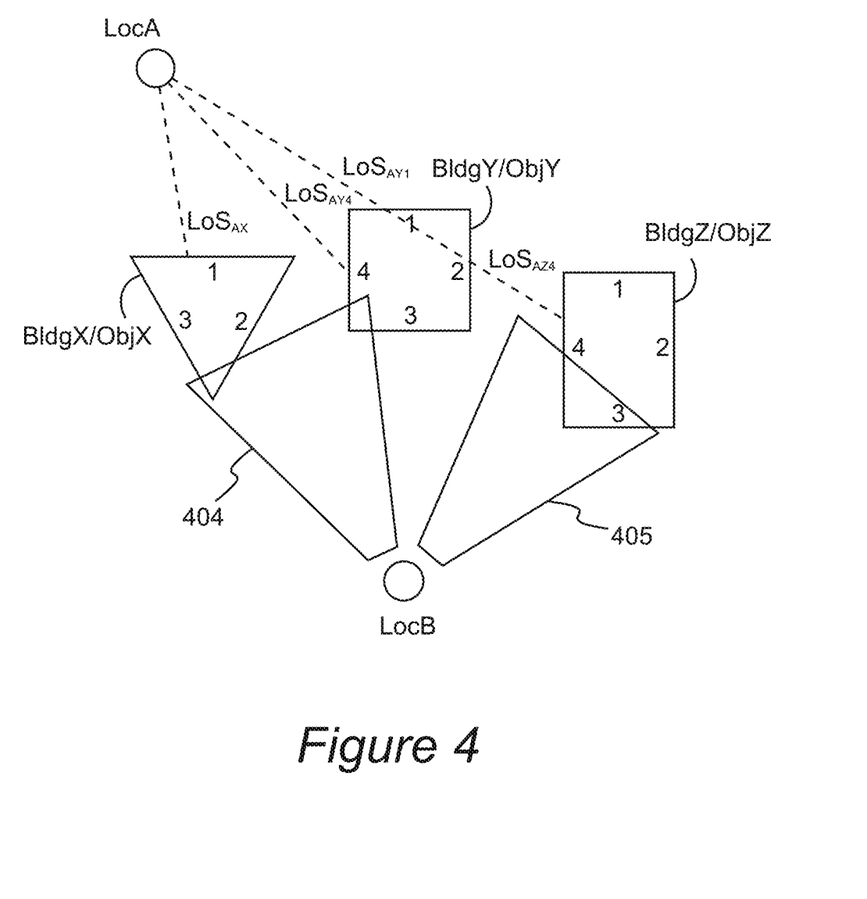
FIG. 4 is a diagram illustrating how the exemplary methods of FIGS. 2 and 3 may be employed in different scenarios.

FIG. 4 provides an illustrative diagram for assisting in the understanding of AR content creation, storage, and retrieval. LocA and LocB are two possible real world locations of a user and the user's mobile device. The triangle, square, and rectangle are each representative of two related things. Each shape illustrates a real world building (BldgX, BldgY, or BldgZ; "Bldg" is short for "building") as well as a virtual object (ObjX, ObjY, or ObjZ; "Obj" is short for "object") which matches the corresponding real world building in shape, size, and location (and possibly other matching criteria). Numbers inside the triangle, square, and rectangle are labels for respective surfaces or sides of the buildings/objects. Dashed lines illustrate some possible lines of sight (LoS) from a user location (LocA or LocB) to a building or object (BldgX/ObjX, BldgY/ObjY, or BldgZ/ObjZ). Two possible viewing frustums from LocB are identified as 404 and 405, respectively. For ease of illustration and discussion the diagram is two-dimensional. In practice three-dimensional space may be used.

According to a first example scenario, a user is at LocA and wants to create AR content by posting a virtual signboard on the side of a nearby real building. Looking around, the user at LocA can see side 1 of BldgX along $LoS_{AX}$. The user can see side 4 of BldgY along $LoS_{AY4}$. The user can also see side 1 of BldgY along $LoS_{AY1}$. Note that BldgZ would be visible along $LoS_{AY1}/LoS_{AZ4}$ were it not for the visual obstruction presented by BldgY. According the user's current view, there are three possible building sides to which a virtual signboard could be posted: side 1 of BldgX, side 4 of BldgY, or side 1 of BldgY. Assume the user selects side 4 of Bldg Y. To create the AR content, the user points her mobile device at BldgY, in particular at side 4 of BldgY, and presses the device's interface button used to initiate the action. The mobile device detects the interface activation and records a real time position and the orientation, which at the time of the activation are LocA and $LoS_{AY4}$. The device uses this pose data to determine that the user's selection for posting the AR content (the signboard) is side 4 of BldgY and not, for example, side 1 of BldgX or side 1 of BldgY. If the user has already selected the signboard as the AR content to post, the mobile device can proceed with actually storing the signboard with the virtual model at ObjY and in particular side 4 of ObjY. If the user has not already selected the signboard as the AR content to post, the mobile device may prompt the user for a selection. The mobile device may provide further prompts as well. For example, the device may verify the object and side selection with the user and/or provide the user an option to select an object and side if multiple objects and/or multiple sides are implicated by the device location and orientation.

According to a second example scenario, a user is at LocB and has the need or desire for an augmented reality experience within the space illustrated by FIG. 4. The user has a mobile device on his person which performs or facilitates the exemplary method 300 for AR content retrieval and provision. Aiming his device so that his camera "sees" BldgX and BldgY, he presses the device's interface button used to initiate the action. His device detects the activation and immediately records the location (LocB) and the orientation of the device. The device then checks for visible objects. In this example, the device performs a frustum based approach. The device uses the location and orientation data and preset values for near and far limits to define a frustum 404. The frustum 404 defines both a region of real world three-dimensional space as well as a corresponding virtual three-dimensional space of the virtual model 107 (FIG. 1), since the virtual model is configured to correspond (e.g., match or replicate) the real world. Applying this viewing frustum in the virtual model, the device identifies which objects are within (including partially within) the frustum. As illustrated by FIG. 4, frustum 404 contains parts of ObjX and ObjY within the virtual model. More specifically, some part of sides 2 and 3 of ObjX and sides 3 and 4 of ObjY fall within the frustum 404. These objects and these sides thereof are candidate sources of AR content. The device then selects which object and which surface of the object to use. The device then further selects which AR content associated with the selected object and select surface to use. The end result is particular AR content which can be supplied as an augmentation (or augmentations) in an augmented reality output. Assume for the purpose of illustration that the method selected side 2 of ObjX, and in particular a virtual signboard associated therewith. The user at LocB may as a result of this process see the virtual signboard posted to side 2 of real BldgX.

Of course the scenario of the preceding paragraph would result in different AR content being retrieved and served to an end user if the location and/or orientation of the user was different at the time of interface activation. For instance, if the user faced his device in the direction of BldgZ at the time of interface activation but remained in the same location (LocB), the frustum 405 may result. As illustrated in FIG. 4, this result may lead to an augmentation on either side 4 or side 3 of BldgZ.

According to a third example scenario using FIG. 4, consider again the circumstances in which a user is at LocA and he has his device oriented along line of sight $LoS_{AY1}$. $LoS_{AY1}$ intersects BldgY, but if extended the line also intersects BldgZ. The linear extension of $LoS_{AY1}$ is labeled in the Figure as $LoS_{AY4}$. In some embodiments or use cases, an option may be presented to a user to "see through" an obstructing object in order to see an obstructed object. In this example, BldgY is an obstructing object and BldgZ is a corresponding obstructed object. It is also accurate to say that ObjY is an obstructing object and ObjZ is a corresponding obstructed object. According to an exemplary protocol, the user's device may be configured to identify both ObjY and ObjZ as "visible" objects despite the obstruction to ObjZ. The device may in this case prompt the user with an option to select an obstructed view. Provided the user makes this selection, the eventual AR output may include an augmentation relating to ObjY which effectively renders BldgY "invisible". In essence, augmentations may be used to substitute the view of BldY, and those augmentations may visually take the appearance of the real world environment which is obstructed by BldgY.

Methods according to the invention (e.g., method 200 of FIG. 2, method 300 of FIG. 3, other methods) may be performed by a mobile device such as a smartphone, wearable (e.g., fitness tracker, smartwatch), laptop, dedicated AR device (e.g., Microsoft HoloLens, Magic Leap), or some other mobile device. More specifically, some or all of the steps may be performed by or with one or more processors of such a device and a camera, supported by other hardware typical of such devices.

"Virtual model" and "virtual world" may be used interchangeably. Since the real world is three-dimensional (3D) to the ordinary perception of humans, a corresponding virtual model may also be characterized as 3D but need not necessarily be so (i.e., a model may be two-dimensional; a model may be four dimensional and include time; a model may be multidimensional with one or more of a plurality of spatial dimensions, a temporal dimension, and other dimensions like color). An exemplary virtual model has virtual locations which are configured to correspond with real world locations. The virtual model may include a virtual landscape modeled after the real world landscape. Real world geography, locations, landscapes, landmarks, structures, and the like, natural or man-made, may be reproduced within the virtual world in like sizes, proportions, relative positions, and arrangements as in the real world. For example, an exemplary 3D virtual model of New York City would in fact resemble New York City in many respects, with matching general geography and landmarks. Within the virtual world, virtual objects may be created (e.g., instantiated) at virtual locations. Since a virtual location corresponds with a real world location, a virtual object at a given virtual location becomes associated with a particular real world location that corresponds with the given virtual location.

The virtual world containing and storing the virtual objects which are employed for generating AR content may be a 3D virtual representation of the real world which may be stored as data in one or more databases (e.g., a central database or a distributed network). Such databases or networks may store, for example, geometric aspects of the virtual representations and characteristics of the objects which are instantiated within that virtual representation.

Generally, augmentations may or may not be in semantic context with real world environmental elements. For example, many Americans are accustomed to augmented reality when watching American football on a television. A football game as captured by video cameras is a real world view. However, the broadcasting company frequently augments the recorded image of the real world view with the line of scrimmage and first down markers on the field. The line and markers do not exist in reality, but rather they are virtual augmentations that are added to the real world view. On any given play, it makes a difference whether the line of scrimmage is depicted at the 40 yard line or the 30 yard line. It isn't enough that a line of scrimmage is depicted, but also what real world objects are present, where they are present, and what real world events are taking place. It matters where and how the line of scrimmage appears in relation to the real world playing field, the players, and the events presently taking place in the game (e.g., an augmentation of a line of scrimmage would not have any meaningful real world context in the middle of a play). The line of scrimmage is in semantic context with the real world (including the real world playing field and real world players) because it's placement in relation to the real world surroundings is based on what real world elements exist and what real world events are taking place. As another example, in televised Olympic races, moving virtual lines can be superimposed on tracks and swimming pools to represent the position of a runner or swimmer keeping pace with the world record in the event. Augmented reality which is not in in real-time but which is still in semantic context with the real world can be, for example, superimposing the line of scrimmage over the image of a football match that is being displayed after the match has already taken place.

"Perspective" as used herein may refer to one or more of location, orientation, pose, position, and field of view. If the image or video is a composite from multiple cameras, information for each of the cameras or a representative camera may be used. Exemplary perspective information includes a location and an orientation. Thus, at minimum, this would describe the camera's view with respect to the location from which the image or video is taken and a direction in which the camera was facing to capture the real world content contained in the image or video.

"Position" and "location" are similar terms and may sometimes (but not necessarily always) be used interchangeably in the art. "Location" is especially prevalent when used in the context of geography or a system of reference used for describing geography (e.g., GPS). "Position" is more common in the context of coordinate systems generally, especially those which are fairly independent of geography (e.g., the Cartesian coordinate system). Both "position" and "location" may be expressed as a point. Unlike "position" however, "location" may be expressed as a region, space, or area. For example, a street corner may be a location, or an entire town may be a location.

Either "position" or "location" may be used to refer to a place where something is, e.g., in a Cartesian coordinate system (or some other coordinate system). As compared with orientation, location may be characterized as linear position whilst orientation may be characterized as rotational position. Location information may be absolute (e.g., latitude, longitude, elevation, and a geodetic datum together may provide an absolute geo-coded position requiring no additional information in order to identify the location), relative (e.g., "2 blocks north of latitude 30.39, longitude −97.71 provides position information relative to a separately known absolute location), or associative (e.g., "right next to the copy machine" provides location information if one already knows where the copy machine is; the location of the designated reference, in this case the copy machine, may itself be absolute, relative, or associative). Absolute location or position involving latitude and longitude may be assumed to include a standardized geodetic datum such as WGS84, the World Geodetic System 1984. In the United States and elsewhere the geodetic datum is frequently ignored when discussing latitude and longitude because the Global Positioning System (GPS) uses WGS84, and expressions of latitude and longitude may be inherently assumed to involve this particular geodetic datum. For the present disclosure, absolute location or position information may use any suitable geodetic datum, WGS84 or alternatives thereto.

"Orientation" may be a rotational position (whereas location may be a linear position). Orientation may also be referred to interchangeably as attitude. Even when constrained to a single location, an object may physically take any of a variety of orientations unless further constraints are in place. Orientation may be expressed according to a direction (e.g., a unit vector). Location and orientation together may describe an object according to the six degrees of freedom in three dimensional space.

"Pose" is a term which may be used to refer to position/location and orientation in the collective.

Field of view (FOV) is the extent of the observable world seen at a given moment, e.g., by a person or by a camera. In photography, the term angle of view (AOV) is more common but can be used interchangeably with the term field of view (FOV).

In some embodiments, one or more processors (e.g., of the device or system that includes the initial camera, or of an AR engine or AR-enabled device) are configured to use some combination of some or all of the following to determine which virtual objects should be provided (e.g., shown or otherwise output) as augmentations: digital compass input from a magnetic sensor; rotational data from a gyroscopic sensor; acceleration data from linear acceleration sensors; GPS data (latitude, longitude, altitude, and geodetic datum) from a GPS sensor; or image data from a video stream (which may itself include augmentations from other AR systems). The processing of this information is used to determine the real world viewing device's (e.g., camera's) position, orientation, and field of view (expressible as a frustum), and to estimate an accuracy of that determination. For example, the one or more processors may determine a viewing device's (e.g., camera's) six-dimensional location. Location may be the set of latitude, longitude, altitude, geodetic datum, and orientation, or include some combination of these. Orientation may be determined as a combination of angles, such as a horizontal angle and a vertical angle. Alternatively, orientation may be determined according to rotations, such as pitch, roll, and yaw.

GPS data along with digital compass and gyroscopic sensor data may be used at a given moment to determine the 3D location and orientation of a camera that is co-located with the relevant sensors. The resulting real world frustum may then be applied to a 3D virtual representation (a virtual world). Corrective algorithms may be used to account for measurement inaccuracies or imprecision. For instance, if a putative augmentation is not be exactly positioned on or adjacent to an object which appears in the real world content, a procedure may be executed which "snaps" the augmentation to the nearest object detected in the image.

Based on the real world viewing device's (e.g., camera's) frustum, and on the detected placement of any relevant image data in the image, augmentations may be displayed as sourced from the 3D virtual representation (a virtual world), as modified by characteristics associated with that representation, and potentially adjusted due to detected image data.

Figure 6:
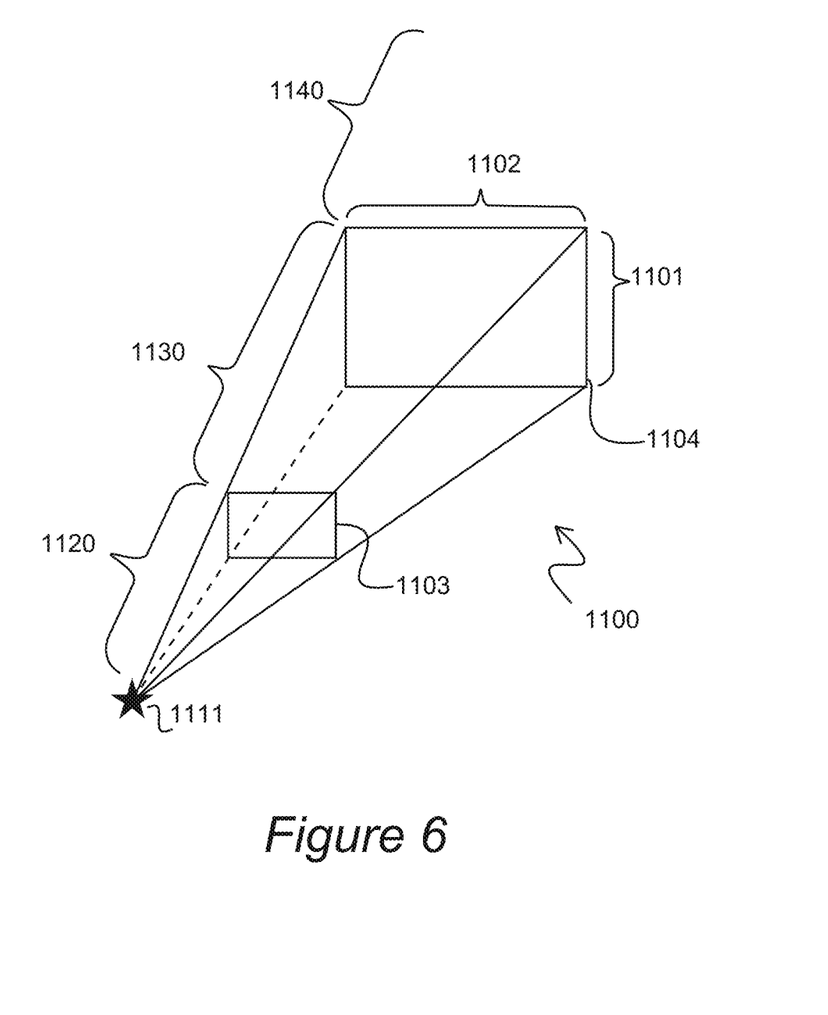
FIG. 6 is a frustum.

"Frustum" may be used to refer to a visible region of three-dimensional space. A real world setting may involve a camera, whereas a virtual world setting may involve a viewpoint (e.g., a virtual camera). In the context of digital spaces (e.g., virtual reality worlds), field of view (FOV) is frequently discussed according to a viewing frustum. FIG. 6 shows an example of a viewing frustum 1100, referred to herein simply as "frustum." Because viewports are frequently rectangular, the frustum is often a truncated four-sided (e.g., rectangular) pyramid. For viewports of other shapes (e.g., circular), the frustum may have a different base shape (e.g., a cone). The boundaries or edges of a frustum 1100 may be defined according to a vertical field of view 1101 (an angle, usually expressed in degrees), a horizontal field of view (an angle, usually expressed in degrees), a near limit (a distance or position), and a far limit (a distance or position). The near limit is given by a near clip plane 1103 of the frustum. Similarly, the far limit is given by a far clip plane 1104 of the frustum. Besides these boundaries, a frustum may also include position and orientation. In short, an exemplary frustum may include position, orientation, field of view (horizontal, vertical, and/or diagonal), and near and far limits. In a digital space, virtual objects falling in the region 1120 between the viewpoint 1111 and the near clip plane 1103 may not be displayed. Likewise, virtual objects falling in the region 1140 which are beyond the far clip plane 1104 may not displayed. Only virtual objects within the frustum 1100, that is to say within the region between the near and far clip planes 1103 and 1104 and within the horizontal FOV 1102 and vertical FOV 1101, may be candidates for representation by augmentation. This differs from a real world view of a camera, where visibility of an object is generally based on horizontal FOV 1102 and vertical FOV 1101 only. That is to say, for a camera in a real world setting, real objects which are within the horizontal FOV 1102 and vertical FOV 1101 are generally visible. In a digital space, a near clip plane 1103 may be set to zero (i.e., at the viewpoint) and a far clip plane 1104 may be set to infinity or substantially infinite distance in order to approximate the view from a camera looking upon the real world. However, omission of objects closer than a virtual camera's near clipping plane (which would ordinarily be out of focus for a real camera), and of objects beyond its far clipping plane (which would for a real camera appear so tiny as to be effectively invisible unless their physical dimensions are quite large) is performed as an efficiency gain in a virtual system. A virtual camera's near clipping plane may be placed arbitrarily close, and the far clipping plane arbitrarily far, if an augmented reality system is willing to do the extra processing required to render the resulting increased volume of the frustum. In any case a frustum may generally correspond with a real camera's field of view. It should be understood that obstruction of one object by another as well as object diminution at great camera-to-object (viewpoint-to-object) distances may result in reducing or eliminating visibility of an object even though it technically exists within a frustum 1100.

An "augmentation" is a unit of virtual content and may be, for example, a virtual object rendered as a graphic on a display device. An augmentation may be visual (most common), audial, tactile, haptic, thermal, gustatory, smellable, or some combination of these. For example, an augmentation may comprise or consist of sound, video, graphic, and/or haptic feedback. The term "augmentation" is often used in the context of AR but is not incompatible with use in the context of VR. An augmentation may involve one or more (i.e., at least one) sensory modality. Sensory modalities may be visual, audial, tactile or haptic (e.g., vibration), or olfactoral or gustatory, or any combination thereof, e.g., audiovisual. Augmentations may take the form of, for example, 3D representations of real objects (e.g., a detailed 3D representation of a cell tower), or of abstractions of real objects (e.g., a cell tower represented as a simple cylinder with a sphere at the top), or of indicators or cues (e.g., callout boxes). Some information represented in an augmentation may have no corresponding real world shape. For example, a wireless network link between two wireless network antennas has no real world visible representation, so any augmented presentation of that connection is necessarily some kind of abstraction (e.g., a geometric shape). On the other hand some information represented in an augmentation may have at least one straightforward augmentation that is minimally abstract, e.g., a 3D graphic of a building that is positioned, shaped and colored to be very much like a corresponding real building.

Some augmentations are or include a solid 3D model rendered within the context of the real world image. Some augmentations are subject to be changed or replaced or substituted entirely over time. Some augmentations are animations superimposed on the real world image. For example, an augmentation may be a scaled 3D model or animation that is played based on some event. Animations may be triggered (e.g., macroed) based on such an event.

A virtual object stored in, with, or with reference to a virtual model may not inherently take a particular state as far as sensory modalities are concerned. For example, a virtual object may not have a particular appearance. Indeed, a virtual object may have no appearance at all, and in essence be "invisible" to an unaided human eye. By contrast, an augmentation is by definition perceptible according to one or more sensory modalities. That is, an augmentation may be seen, heard, touched, smelled, and/or tasted. An augmentation may be regarded as the "face" of a virtual object, in which case data stored in, by, or with the virtual object is used to determine what the augmentation portrays or signifies to a user looking upon that "face".

Figure 5:
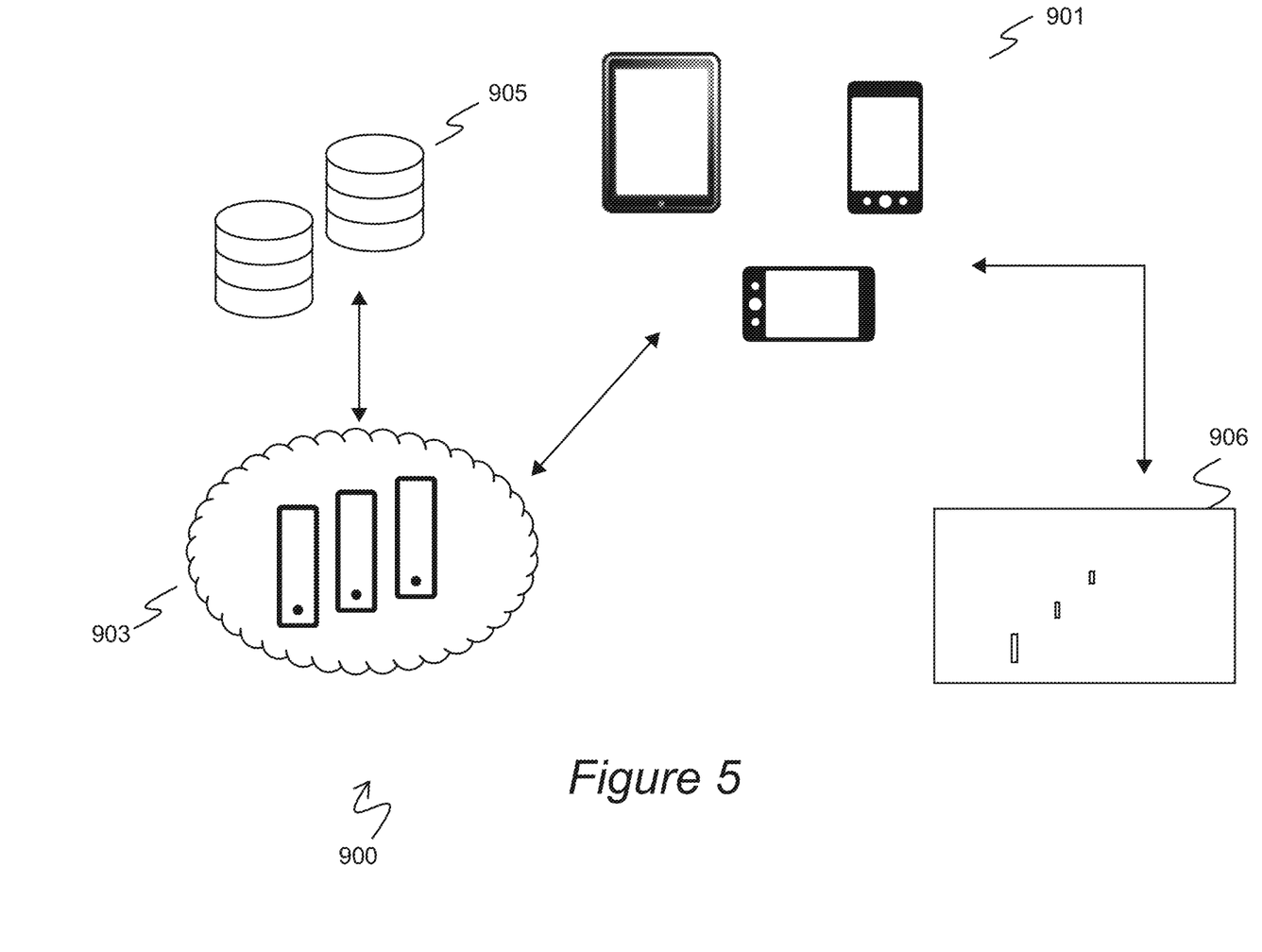
FIG. 5 is an exemplary system.

Exemplary processes are generally carried out by some combination of hardware, software, and firmware, either in a particular electronics device or by a system of electronic devices. FIG. 5 is a schematic of an exemplary system 900 for providing an augmented reality. Electronic devices 901 may include sensors for collecting data about a user's physical location and pose (position and orientation). In particular, the data may reflect the location and pose of a device 901 itself. The devices 901 may comprise one or more cameras for capturing a real world view of a geographic space. The captured/collected data may be sent to the cloud 903 (e.g., processors of one or more geographically remote servers) for data processing (e.g., frustum determination, application of real world frustum to virtual world, virtual object candidate identification, augmentation selection, augmentation modification, etc.). In addition or as an alternative to a centralized cloud-based system, processors involved in performing steps of processes of the invention may be part of a decentralized system, e.g. an ad hoc system that varies from one embodiment or even one user to the next, at least in terms of the particular hardware providing the computational power for carrying out the described methods. Databases 905 (which may be one database or many) provide permanent or semi-permanent storage and retrieval for network relevant data, virtual world geometric data, other virtual world data, virtual object data, and essentially every other data discussed herein which is not being newly collected from the sensors and cameras which may be deployed in the field. It should be appreciated that the various data types discussed herein which are generally stored in the databases, in particular virtual object data, may be updated over time when new data becomes available or existing data becomes outdated or expired. Virtual objects and augmentations based on those virtual objects may be correspondingly updated. The processors may use an image or video feed from the devices 901 and sensor data, in particular location data, to generate other data. Augmented image data may be sent back to the devices 901 (or other output device as appropriate) which generates the augmented image 906 on its display device.

An "output device", as used herein, may be a device capable of providing at least visual, audio, audiovisual, or tactile output to a user such that the user can perceive the output using his senses (e.g., using her eyes and/or ears). In many embodiments, an output device will comprise at least one display, at least one speaker, or some combination of display(s) and speaker(s). A suitable display (i.e., display device) is a screen of a mobile electronic device (e.g., phone, smartphone, GPS device, laptop, tablet, smartwatch, etc.). Another suitable output device is a head-mounted display (HMD). In some embodiments, the display device is a see-through HMD. In such cases the display device passively permits viewing of the real world without reproducing details of a captured real world image feed on a screen. In a see-through HMD, it is generally be only the augmentations that are actively shown or output by the device. Visual augmentations are in any case superimposed on the direct view of the real world environment, without necessarily involving the display of any of the original video input to the system. In fact, for systems which do not use the video input to detect image data, the system may include one or more HMDs that have no camera at all, relying entirely on other sensors (e.g. GPS, gyro, compass) to determine the relevant augmentations, and displaying them on otherwise transparent glasses or visors. Output devices and viewing devices may include or be accompanied by input devices (e.g., buttons, touchscreens, menus, keyboards, data ports, etc.) for receiving user inputs.

Some embodiments of the present invention may be a system, a device, a method, and/or a computer program product. A system, device, or computer program product may include a computer readable storage medium (or media) having computer readable program instructions thereon for causing a processor to carry out aspects of the present invention, e.g., processes or parts of processes or a combination of processes described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Processes described herein, or steps thereof, may be embodied in computer readable program instructions which may be paired with or downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions and in various combinations.

These computer readable program instructions may be provided to one or more processors of one or more general purpose computers, special purpose computers, or other programmable data processing apparatuses to produce a machine or system, such that the instructions, which execute via the processor(s) of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described herein in connection with exemplary embodiments and features, one skilled in the art will recognize that the invention is not limited by the disclosure and that various changes and modifications may be made without departing from the scope of the invention as defined by the appended claims.

I claim:

1. A method for augmented reality (AR) using a virtual model that corresponds to a real world, comprising
    determining a real world pose of a camera of a mobile device, wherein the real world pose comprises location and orientation of the camera within a geodetic datum;
    recording the location and orientation of the camera;
    mapping the real world pose to a pose within a virtual model, wherein virtual locations in the virtual model correspond with respective real world locations, wherein the virtual model contains virtual objects which are employable for storing and retrieving visual content, wherein a virtual object at a given virtual location is associated with a particular real world location that corresponds with the given virtual location;
    selecting one or more virtual objects from among the virtual objects within the virtual model using the pose within the virtual model; and
    placing visual content on one or more virtual surfaces of the selected one or more virtual objects such that the visual content is incorporated into and stored with the virtual model.

2. The method of claim 1, further comprising recording one or more of a time, user identification, restrictions on eligible future viewers, lifetime, and any designated content triggers upon activation of an interface of the mobile device.

3. The method of claim 2, further comprising verifying a user subscription and granting access to the placed visual content on a user-by-user basis based on subscription status.

4. The method of claim 1, further comprising displaying a real time camera feed concurrent with the recording step.

5. The method of claim 2, further comprising monitoring the interface to detect activation of an interface button.

6. The method of claim 5, wherein the interface button is configured to trigger recording of photographs or video with a camera of the mobile device.

7. The method of claim 1, wherein at least the recording step is performed by a first mobile device and at least the placing step is performed by a second mobile device different from the first mobile device.

8. The method of claim 7, wherein the first and second mobile devices are smartphones, head mounted displays, or wearables.

9. The method of claim 7, wherein the selecting step is performed by the first mobile device, the second mobile device, or a cloud computing device.

10. The method of claim 1, wherein the virtual model is modeled to replicate at least some real world objects that are within sight of the mobile device at a time of the recording step.

11. The method of claim 10, further comprising serving the virtual model to a plurality of mobile devices and repeating the placing step for multiple of the plurality of mobile devices.

12. The method of claim 1, further comprising storing multiple visual contents with a single virtual object.

13. The method of claim 1, wherein
    the mapping step comprises determining a line of sight or a viewing frustum using the real world pose and applying the line of sight or viewing frustum to the virtual model, and
    the selecting step limits selection to virtual objects which have virtual locations which lie along the applied line of sight or which fall within boundaries of the applied viewing frustum.

14. The method of claim 1, wherein the visual content comprises a photograph, graphic, animation, video, image, texture, pattern, map, or color.

15. The method of claim 1, wherein the step of selecting is performed by the mobile device or a cloud computing device.

16. The method of claim 1, further comprising granting access to the visual content at one or more computers or servers remote from the mobile device.

17. The method of claim 1, further comprising retrieving content from the virtual model for one or more users, wherein the retrieved content is the visual content or some other content which the virtual model has stored.

18. The method of claim 17, further comprising displaying the retrieved content with one or more computers or servers remote from the mobile device or the location of the camera.

19. A non-transitory computer readable medium comprising computer readable instructions which, when executed by one or more processors, cause the one or more processors to perform
    determining a real world pose of a camera of a mobile device, wherein the real world pose comprises location and orientation of the camera within a geodetic datum;
    mapping the real world pose to a pose within a virtual model, wherein virtual locations in the virtual model correspond with respective real world locations, wherein the virtual model contains virtual objects which are employable for storing and retrieving visual content, wherein a virtual object at a given virtual location is associated with a particular real world location that corresponds with the given virtual location;
    selecting one or more virtual objects from among the virtual objects within the virtual model using the pose within the virtual model; and
    placing visual content on one or more virtual surfaces of the selected one or more virtual objects such that the visual content is incorporated into and stored with the virtual model.

20. The non-transitory computer readable medium of claim 19, wherein the mapping step comprises determining a line of sight or a viewing frustum using the real world pose and applying the line of sight or viewing frustum to the virtual model, and the selecting step limits selection to virtual objects which have virtual locations which lie along the applied line of sight or which fall within boundaries of the applied viewing frustum.

21. An augmented reality (AR) system comprising one or more processors configured to perform determining a real world pose of a camera of a mobile device, wherein the real world pose comprises location and orientation of the camera within a geodetic datum;

mapping the real world pose to a pose within a virtual model, wherein virtual locations in the virtual model correspond with respective real world locations, wherein the virtual model contains virtual objects which are employable for storing and retrieving visual content, wherein a virtual object at a given virtual location is associated with a particular real world location that corresponds with the given virtual location;

selecting one or more virtual objects from among the virtual objects within the virtual model using the pose within the virtual model; and placing visual content on one or more virtual surfaces of the selected one or more virtual objects such that the visual content is incorporated into and stored with the virtual model.

22. The AR system of claim 21, wherein the mapping step comprises determining a line of sight or a viewing frustum using the real world pose and applying the line of sight or viewing frustum to the virtual model, and the selecting step limits selection to virtual objects which have virtual locations which lie along the applied line of sight or which fall within boundaries of the applied viewing frustum.

* * * * *